United States Patent Office 3,109,464
Patented Nov. 5, 1963

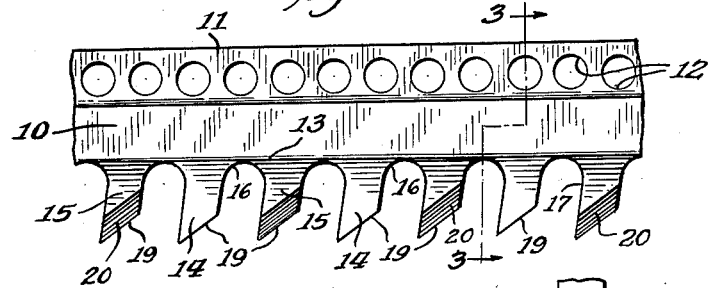
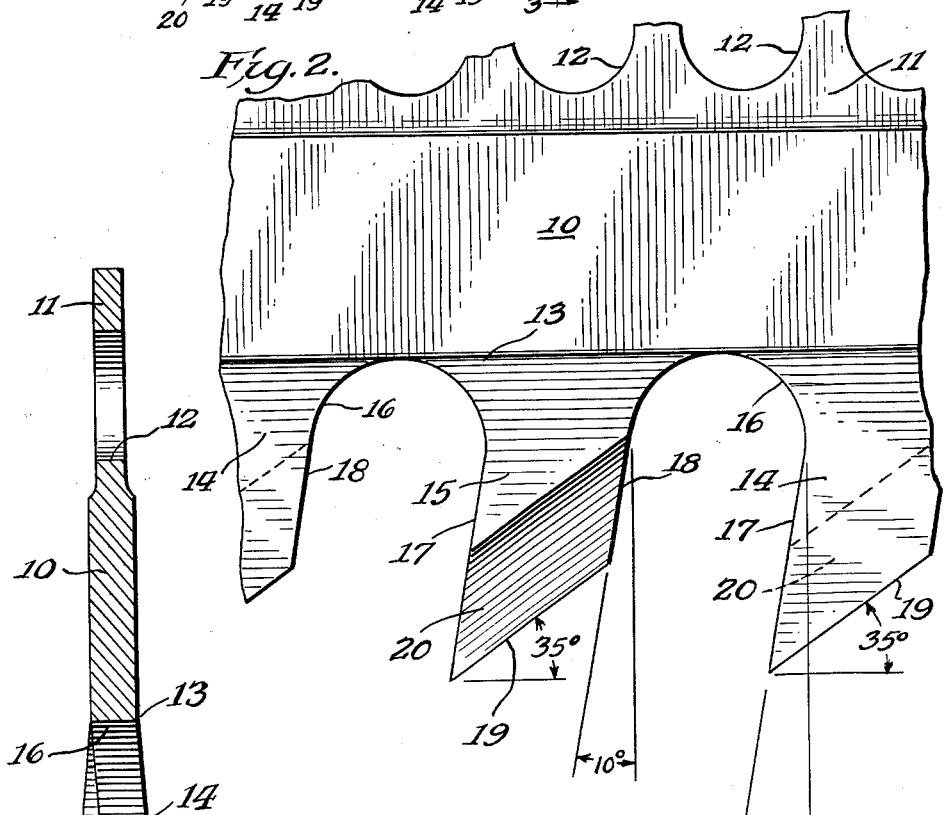
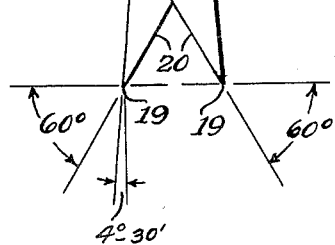
Inventor
Walter P. La Force
By Brown, Jackson, Boettcher & Dienner
Attys.

3,109,464
RECIPROCATING SAW BLADE
Walter P. La Force, Sheboygan, Wis., assignor to Thomas Industries Inc., Louisville, Ky., a corporation of Delaware
Filed Apr. 6, 1960, Ser. No. 20,486
3 Claims. (Cl. 143—133)

The present invention relates to a saw blade for reciprocating saws, and more particularly to such a blade having an improved tooth structure providing important operating advantages in high-speed, short-stroke saws.

It has heretofore been proposed to employ saw blades of particular formations for short-stroke reciprocating saws, as for example the blade disclosed in Wright Patent No. 2,849,037, issued August 26, 1958. The blade of this patent has teeth laterally offset at their root portions from the body of the blade and bent to dispose the cutting points laterally outward of the root offsets. The teeth are also formed with cutting and other edges extending at angles designed to result in fast, clean cutting and efficient removal of sawdust from the kerf. It has been found in practice, however, that such prior art blades, including the blade of said patent, have ceratin drawbacks which lessen their usefulness. Thus, for example, the blade may chatter due to a tearing rather than a shearing action on the wood being cut. Another difficulty lies in the development of undue friction in use, resulting in a waste of power.

The reciprocating saw blade of this invention, by reason of hereinafter-described structural formations and elements an a novel arrangement and combination thereof, avoids and remedies the several shortcomings and defects of such prior blades, and provides improved performance and operation.

One object of the invention is the provision of a reciprocating saw blade which requires less power in operation than prior blades of this type.

Another object is the provision of a reciprocating saw blade which substantially eliminates chatter.

Another object is the provision of a reciprocating saw blade which tends to feed itself into the work.

A further object is the provision of a reciprocating saw blade which is self-limiting in depth of penetration of the work so as to cut cleanly and avoid tearing.

Another object of the invention is the provision of a reciprocating saw blade which affords greater accommodation for sawdust to avoid packing thereof and consequent "riding" of the blade.

It is also an object to provide a reciprocating saw blade which is simpler and easier to form than prior blades of this type.

Other and further objects, advantages, and features of the invention will be apparent to those skilled in the art from the following detailed description, taken in conjunction with the accompanying drawings, in which:

FIG. 1 is a fragmentary side elevational view of a reciprocating saw blade according to the present invention;

FIG. 2 is a view similar to FIG. 1, but on an enlarged scale to show details more clearly; and FIG. 3 is an enlarged cross-sectional view taken substantially as indicated by the line 3—3 in FIG. 1.

Referring to the drawings, there is shown in FIG. 1 a portion of a saw blade according to the present invention, shown in greater detail and on an enlarged scale in FIG. 2. The blade comprises a substantially straight, generally flat elongated blade body 10 which has along one longitudinal edge thereof a portion 11 of reduced thickness in which longitudinally spaced apertures 12 are formed to reduce the weight of the blade, in a well-known manner. The tongue 11, as best shown in FIG. 3, is symmetrical relative to the midplane of the blade, and is designed to be received in the guide channel of a reciprocating saw.

Extending from the other edge of the blade body 10, along a body edge line indicated at 13, are teeth 14 and 15 alternatingly arranged longitudinally of the blade and spaced from each other by gullets 16 which are somewhat wider than the teeth, and extend substantially to the edge line 13. The teeth 14 and 15 are substantially identical, but oppositely disposed or arranged, and have a slight forward angle or rake, this forward angle being specifically shown as 10°. The forward and rear edges 17 and 18 respectively of each of the teeth are substantially parallel, and of course extend at the indicated angle of 80° to the edge line 13. The teeth 14 and 15 are somewhat narrower than the gullets 16 by which they are separated. The teeth are bent on the edge line 13 to extend laterally outwardly of the blade body, the teeth 14 being bent to the right as viewed in FIG. 3, and the teeth 15 being bent to the left. The amount of bending of the teeth is not great, but is considerably more than has been heretofore considered sufficient. The angle as disclosed herein is 4°30' relative to the plane of the blade body. The free ends 19 of the teeth are formed to extend at an angle relative to the edge line 13 which is sufficiently acute or shallow to prevent excessive penetration on the cutting stroke of the wood or other material being cut by the blade, this bottom clearance angle of the edges 19 being shown as 35°. The inner face of each tooth is beveled adjacent the edge 19, as indicated at 20, to form an acute angle with the outer face of the tooth and thus form the edge 19 as a sharpened cutting edge of the tooth. The beveled surfaces extend each at an angle of 60° to a plane normal to the plane of the blade, as indicated in FIG. 3. It will be obvious that the angularity of the surfaces defining each cutting edge is less than 30°, and in fact is only about 25°.

In the forward or cutting stroke of the blade, the cutting edges slice or shear through the wood fibers or other material on which the saw is used, and by reason of their angled disposition, as well as the forward inclination or angling of the teeth, penetrate through the adjacent surface of the material. The forward rake or angling of the teeth results in a self-feeding action of the blade, so that no great pressure is required to assure the taking of a proper bite by the saw. The relatively small bottom clearance angle of the cutting edges 19, however, provides a limit on maximum penetration in any cutting stroke. The penetration normally is only a fraction of the maximum, depending upon such factors as the hardness of the wood, the number of teeth engaged, pressure applied to the saw, and the speed of the means driving the blade. As noted hereinabove, too great a penetration, in certain woods, results in chattering of the blade because of the teeth in effect having to tear loose large chips which are only incompletely cut away. Such chatter is prevented by the limitation of penetration afforded by the present construction. The forward faces 17 of the teeth push the cut material forwardly, in the form of chips and sawdust, received in the gullets 16 between the teeth, and in the side clearance spaces between the outer faces of the blade and the sides of the kerf cut thereby. It is to be noted that while the spacing between the cutting edges of adjacent teeth 14 and 15, measured laterally or crosswise of the body, is shown as somewhat more than twice the thickness of the blade body 10, there is no lateral gap between the bevels 20 of the teeth adjacent the center of the kerf, or the midplane of the blade, the planes of the beveled surfaces 20 of adjacent or alternate teeth intersecting substantially at the midplane of the blade, as will be evident from FIG. 3. Thus there is no central strip of uncut material at the bottom of the kerf, despite the lateral spread of the teeth, because the angle of the beveled surfaces is such as to effect a relative overlap of the teeth at their inner edges.

The relatively widespread teeth provide a considerably wider side clearance for the blade in the kerf than is achieved by prior blades of this type. Since the spacing of the cutting edges of the teeth measured transversely of the blade body is more than twice the body thickness, it will be evident that the cutting edges extend laterally outwardly of the blade body on each side by more than half the thickness of the body. Obviously, this provides a relatively great space between the blade body and the kerf side for the reception and passage of sawdust and chips. The present blade achieves this greater side clearance by increasing the angle of bend of the teeth relative to the blade body, over and beyond the degree of angularity considered preferable and desirable by the prior art. In addition to providing for easier removal of chips and sawdust, the greater side clearance afforded by the blade of this invention reduces power requirements, because of the lessening of friction, as will be obvious. This reduction in the power needed for proper operation of the saw is aided and increased by the relatively great angle of the bevels 20, which results in a more acute or sharper cutting edge on each tooth, which of course also reduces the frictional drag. The angle of the beveled surfaces is considerably greater than bevel angles normally employed in the teeth of prior reciprocating saw blades. The 60° bevel angle, together with the greater side clearance angle or bend angle of the teeth, provides a much sharper tooth than would be considered advisable in prior constructions, since it has heretofore been considered that such a small angularity of the cutting edge of the tooth will result in weakness and in rapid wear requiring frequent resharpening. It is also to be noted that the greater side clearance resulting from the greater side clearance angle of the teeth is augmented by a greater length of the several teeth than is found in prior art saw blades of the present type, such added length of course resulting in a greater lateral projection of the teeth outwardly relative to the opposite faces of the blade body 10.

The increased length of the teeth, together with the consequent greater depth of the gullets therebetween, provides more space in which sawdust may accumulate without affecting operation of the saw, and also facilitates movement of the sawdust and chips from the bottom of the kerf to the side clearance spaces through which it may be ejected from the kerf. The fact that the gullets are wider than the teeth also contributes to the greater space provided for the accumulation and discharging movement of the sawdust, as will be self-evident. In this connection, the greater bevel angle of the teeth is an additional factor in movement of the sawdust toward the side clearance spaces and out of the way of the saw teeth. In more nearly approaching the vertical, the beveled surfaces 20 have less tendency to force the sawdust downwardly to be packed under the teeth, and because of the more acute cutting edges defined in part thereby, the teeth tend to slice through any sawdust therebeneath. The effect of these various factors in reducing the possibility of packing of the sawdust is to reduce most appreciably any tendency of the blade to "ride" in the kerf due to such packing, so that maximum cutting efficiency is substantially maintained.

The blade of this invention is simple in form, and is relatively easy and inexpensive to manufacture, since the teeth are all substantially identical and may readily be shaped and formed from a suitable blank. There is no complication either in the manufacture or in the use and resharpening of the blade due to any necessity for setting of the teeth, as is normally the case with reciprocating saw blades, and in fact with most saw blades. Despite the simplification achieved by the invention, the blade gives improved results.

While certain angular and spatial relationships have been specifically disclosed herein between various parts and elements of the blade of this invention, and while such relationships are preferred as yielding optimum results from an all-around standpoint, on various types of wood with a normal blade speed, stroke length, and power application, it is within the purview of the invention to alter and modify the relationship or relationships between or among two or more of the elements or parts. Such changes will result in variations in the proportionate effect of the several elements and the factors represented thereby in the final result achieved by the blade. The precise form of the blade may thus be adjusted to changes in the operating factors, such as the length of stroke or the speed of operation. Changes might also be made, of course, to suit the blade more precisely to one particular material to be cut thereby. It should be understood, however, that the changes in the several relationships which may be made must necessarily be of relatively limited character if the results provided by the invention are to be retained.

From the foregoing, it will be evident that the invention is not limited to the precise construction, shape, form, and arrangement of the blade and its several component elements which have been disclosed, but that the invention may be embodied in constructions varying from the particular embodiment which has been disclosed herein. The invention is not intended to be limited otherwise than as required by the spirit and scope of the appended claims.

I claim:

1. A reciprocating saw blade comprising a metal strip providing a substantially flat blade body and a plurality of relatively long substantially identically dimensioned teeth projecting from a common line along one edge of the body and angularly bent on said common line alternately to opposite sides of the blade body at an angle to the midplane of the body of about 4° 30' with the planes of the teeth intersecting said midplane substantially on said line, gullets of a width greater than that of the teeth extending substantially to said line to space the teeth from each other longitudinally of the blade, the teeth having a forward rake of substantially 10° with the front and rear edges substantially parallel, the free ends of the teeth being formed to extend at an angle of about 35° to the common line and having the inner faces thereof beveled at an angle of about 30° to the midplane of the blade body to define with the outer faces of the teeth cutting edges of an angularity of about 25° 30', the cutting edges of adjacent teeth being spaced apart laterally more than twice the thickness of the teeth.

2. A reciprocating saw blade comprising a metal strip providing a substantially flat blade body and a plurality of relatively long substantially identically dimensioned teeth projecting from a common line along one edge of the body and spaced from each other longitudinally of the body by gullets of greater width than the teeth, the teeth having a forward rake of approximately 10° and being angularly bent on said common line alternately to opposite sides of the blade body at an angle to the midplane of the body of from about 4° to about 5° with the planes of the teeth intersecting said midplane substantially on said line, the free ends of the teeth being formed to extend at an angle of about 35° to the common line and having the inner faces thereof beveled at an angle of about 30° to the midplane of the blade body to define with the outer faces of the teeth cutting edges of an angularity of about 25° to 26°, the cutting edges of adjacent teeth being spaced apart laterally more than twice the thickness of the teeth.

3. A reciprocating saw blade comprising a metal strip providing a substantially flat blade body and a plurality of teeth extending from a common line along one edge of the body having a forward rake of about 10° with the front and rear edges substantially parallel and being spaced from each other longitudinally of the blade body by gullets of greater width than the teeth, the teeth being angularly bent from the blade body alternately to opposite sides thereof at an angle thereto of from about 4° to about 5°, the free ends of the teeth being formed to extend at an angle of about 35° to said common line and having the inner faces thereof beveled at an angle of about 30° to the blade body to define with the outer faces of the teeth cutting edges of an angularity of about 25°.

References Cited in the file of this patent

UNITED STATES PATENTS

| | | |
|---|---|---|
| 835,226 | Oakes | Nov. 6, 1906 |
| 2,535,714 | Anderson et al. | Dec. 26, 1950 |
| 2,763,298 | Tomkies | Sept. 18, 1956 |
| 2,849,037 | Wright | Aug. 26, 1958 |

FOREIGN PATENTS

| | | |
|---|---|---|
| 895,518 | Germany | Nov. 2, 1953 |